(12) United States Patent
Da Silva et al.

(10) Patent No.: US 11,596,026 B2
(45) Date of Patent: Feb. 28, 2023

(54) PROXIMITY DETECTION BY MULTIPLE WLAN LINK TRACKING

(71) Applicant: Intel Corporation, Santa Clara, CA (US)

(72) Inventors: Claudio Da Silva, Portland, OR (US); Carlos Cordeiro, Portland, OR (US); Preston Joel Hunt, Portland, OR (US); Artyom Lomayev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 161 days.

(21) Appl. No.: 16/904,054

(22) Filed: Jun. 17, 2020

(65) Prior Publication Data

US 2020/0323034 A1  Oct. 8, 2020

Related U.S. Application Data

(60) Provisional application No. 62/874,170, filed on Jul. 15, 2019, provisional application No. 62/864,000, filed on Jun. 20, 2019.

(51) Int. Cl.
| | |
|---|---|
| *H04W 88/08* | (2009.01) |
| *G01S 13/56* | (2006.01) |
| *H04W 4/029* | (2018.01) |
| *H04B 17/336* | (2015.01) |
| *H04W 64/00* | (2009.01) |
| *H04W 24/10* | (2009.01) |
| *H04W 84/12* | (2009.01) |

(52) U.S. Cl.
CPC ............. *H04W 88/08* (2013.01); *G01S 13/56* (2013.01); *H04B 17/336* (2015.01); *H04W 4/029* (2018.02); *H04W 24/10* (2013.01); *H04W 64/006* (2013.01); *H04W 84/12* (2013.01)

(58) Field of Classification Search
CPC ..... H04W 88/08; H04W 4/029; H04W 24/10; H04W 64/006; H04W 84/12; H04W 4/023; H04W 8/005; H04W 48/16; H04W 24/08; G01S 13/56; G01S 7/006; G01S 13/003; H04B 17/336; H04B 17/391; H04B 17/26
See application file for complete search history.

(56) References Cited

U.S. PATENT DOCUMENTS

2020/0145072 A1*  5/2020  Dash .................... H04B 7/0456

OTHER PUBLICATIONS

Gong, L., "WiFi-Based Real-Time Calibration-Free Passive Human Motion Detection", Sensors 15, (2015), 17 pgs.

(Continued)

*Primary Examiner* — Kabir A Timory
(74) *Attorney, Agent, or Firm* — Schwegman Lundberg & Woessner, P.A.

(57) ABSTRACT

Embodiments of a STA configured for proximity detection by multiple WLAN link tracking are disclosed herein. In some embodiments, the STA performs WLAN sensing using two or more WLAN links with one or more other STAs to track a channel state of each link and performs motion detection based on the tracked channel state of each WLAN link to detect motion in any of the WLAN links. If motion is detected in at least some of the WLAN links, the STA may perform proximity detection to indicate proximity by combining results of the WLAN sensing for each link to determine whether the motion is proximate to the STA or proximate to one of the other STAs.

20 Claims, 5 Drawing Sheets

(56) References Cited

OTHER PUBLICATIONS

Ma, Y, "WiFi Sensing with Channel State Information: A Survey", ACM Comput. Surv., vol. 52, No. 3, Article 46, (Jun. 2019), 36 pgs.
Qian, K, "PADS: Passive Detection of Moving Targets with Dynamic Speed using PHY Layer Information", 2014 IEEE International Conference on Parallel and Distributed Systems, (2014), 8 pgs.

* cited by examiner

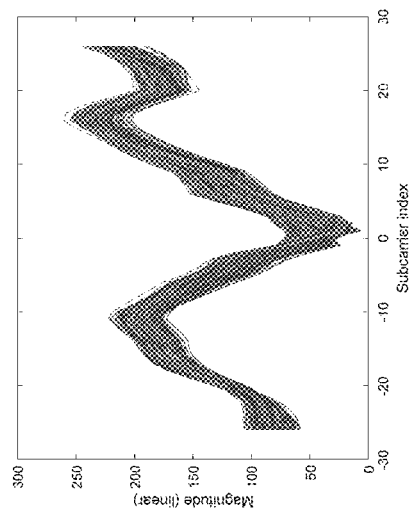
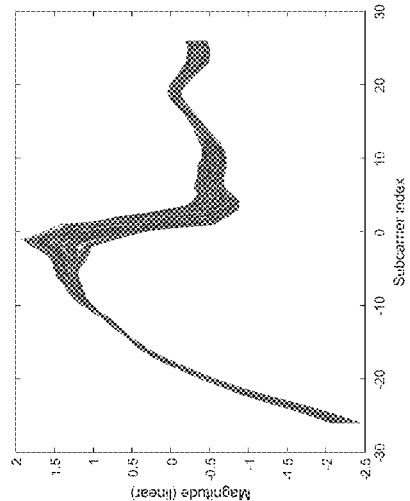
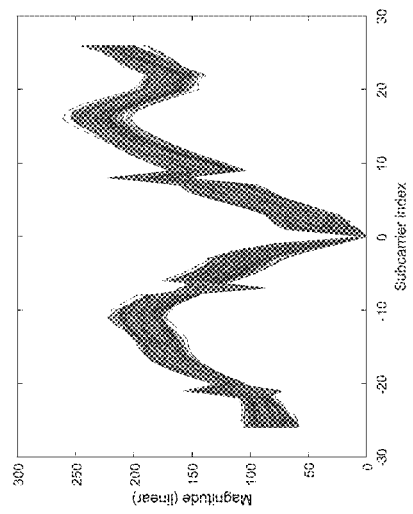
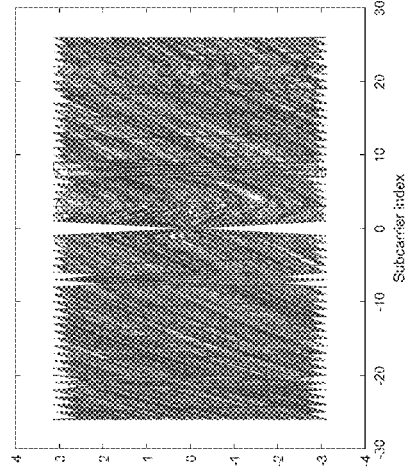
FIG. 3
FIG. 4

PROXIMITY DETECTION BY MULTIPLE WLAN LINK TRACKING

PRIORITY CLAIM

This application claims priority under 35 U.S.C. 119(e) to U.S. Provisional Patent Application Ser. No. 62/864,000, filed Jun. 20, 2019 [reference number AC2987-Z], and to U.S. Provisional Patent Application Ser. No. 62/874,170, filed Jul. 15, 2019 [reference number AC3052-Z] each of which is incorporated herein by reference in its entirety.

TECHNICAL FIELD

Embodiments pertain to wireless local area networks (WLANs). Some embodiments pertain to WLAN sensing. Some embodiments pertain to the IEEE 802.11 WLAN Sensing Study Group. Some embodiments pertain to the IEEE 802.11bf WLAN Sensing Task Group.

BACKGROUND

WLAN sensing enables motion detection, gesture recognition as well as biometric measurement by using WLAN signals. It creates opportunities for service providers within the home security, health care, enterprise, and building automation and management markets and many more. Thus, there are general needs for improved WLAN sensing techniques that more accurately detect motion and can better determine proximity.

BRIEF DESCRIPTION OF THE DRAWINGS

FIGS. 3 and 4 illustrate measurement conditioning in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
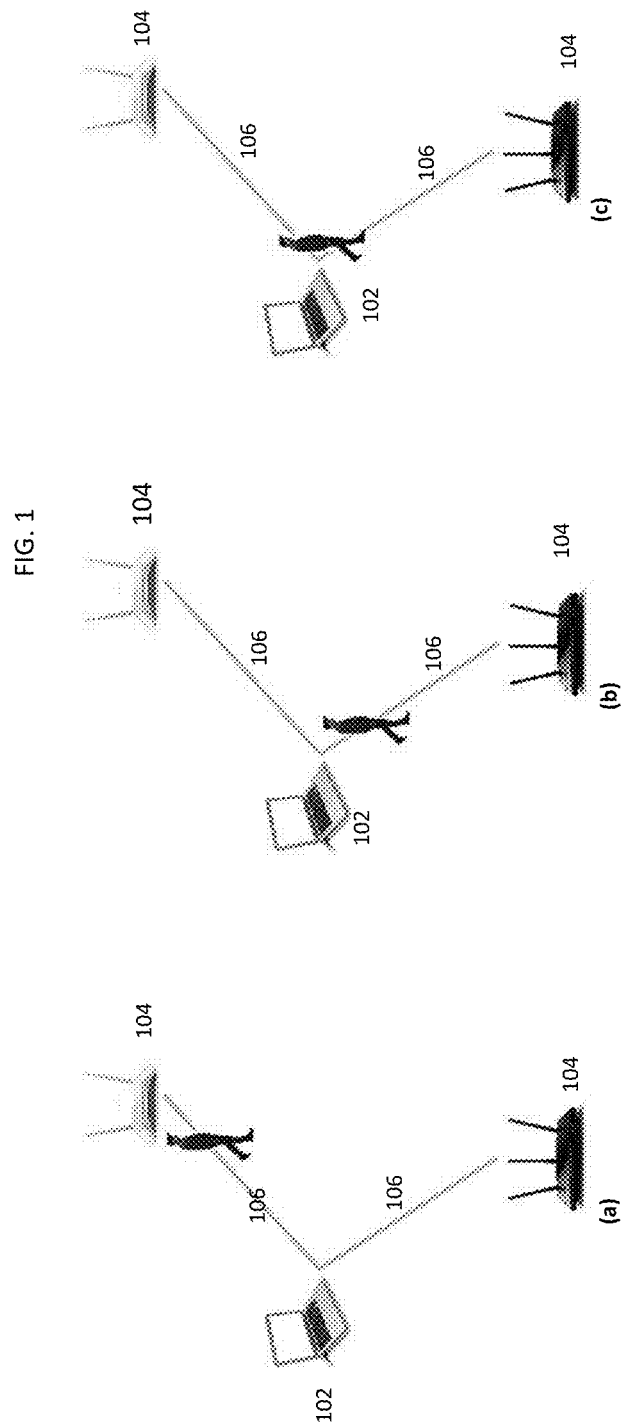
FIG. 1 illustrates proximity detection based on WLAN sensing using multiple WLAN links in accordance with some embodiments.

FIG. 1 illustrates proximity detection based on WLAN sensing using multiple WLAN links in accordance with some embodiments. In accordance with embodiments, as a person or object moves around a given environment, it impacts how a WLAN signal propagates from transmitter to receiver (e.g., propagation paths are created and destroyed generating time-varying multipath fading). The impact of motion to channel estimates can be seen with multiple WLAN packets over time. Detecting motion in a given environment can be performed measuring changes in the channel estimates of a WLAN link over time under certain conditions (for example, depending on the relative position between the person/object, transmitter, and receiver). It should be noted that the motion indicated by tracking changes in one WLAN link can be close to the transmitter, close to the receiver, or almost anywhere in the environment covered by the transmitter and receiver. Therefore, it may be difficult to reliably perform proximity detection (i.e., a user is approaching the device) by monitoring a single radio link. However, if multiple links are tracked, the system may detect changes to just one (or a few) of the links it tracks or to all (or most) of them. This fact can serve as an indication whether motion is closed to the desired device—that is, proximity detection may be identified.

As discussed above, if multiple links are tracked for motion by a given device, the device may detect changes to just one (or a few) of the links it tracks or to all (or most) of them. For example, in the scenario illustrated in FIG. 1(*a*), stronger motion will likely be detected in the upper link only (because the user is close to the upper APs). Similarly, in FIG. 1(*b*), "strong" motion will likely be detected in one of the links (lower link) and "weak" motion is detected in the other (upper) link. This is an indication that movement is relatively far from the notebook. However, if movement is close to the notebook, as illustrated in FIG. 1 (*c*), both links will show "strong" motion and the notebook computer would indicate, with a certain degree of reliability, that a user is approaching the device.

In accordance with embodiments disclosed herein for proximity detection, a target device continuously tracks changes to the channel estimates of each of its multiple WLAN links over time. In some embodiments, for each of its links, the target device determines if motion was detected. In some embodiments, a signal processing algorithm may be used for motion detection. For example, the algorithm could track the variance of changes in the phase of channel estimates obtained from packet to packet, or changes in the eigenvalues of the covariance matrix of the channel estimates obtained with a given number of packets. In some embodiments, if motion is detected in all (or most) of its WLAN links, the WLAN sensing mechanism indicates proximity detection (that is, motion is close to the target device). In some embodiments, the procedure used to combine (motion detection) results could be as simple as using a logical AND: If motion detection is indicated in all links, then motion is close to the target device (proximity detection); otherwise, no proximity detection is indicated. In some other embodiments, majority decision logic may be used (e.g., If most links indicate motion, proximity detection is indicated). In some embodiments, a plausible decision rule would be "if X out of Y WLAN links indicates motion, proximity detection is indicated."

In some embodiments, more complex "combining" algorithms could be used. For example, the SNR or RSS of each link could be considered when fusing information obtained with each link. Moreover, as a second example, the threshold used by the motion detection algorithm could be optimized by considering information from all links.

Some embodiments disclosed herein are directed to an apparatus of a station (STA) 102. The apparatus may comprise processing circuitry and memory. The STA 102 may be configured by the processing circuitry for proximity detection by multiple WLAN link tracking. The STA 102 may perform WLAN sensing using two or more WLAN links 106 with one or more other STAs 104 to track a channel state of each link, the channel state to include at least a signal-to-noise ratio (SNR). In these embodiments, the STA 102 may perform motion detection based on the tracked channel state of each WLAN link 106 to detect motion in any of the WLAN links. In these embodiments, if motion is detected in at least some of the WLAN links, the STA 102 may perform proximity detection to indicate proximity by combining results of the WLAN sensing for each link to determine whether the motion is proximate to the STA 102 or proximate to one of the other STAs 104. In some of these embodiments, the memory is configured to store the tracked channel state of each WLAN link.

In some embodiments, the proximity of any detected movement with respect to the STA 102, or with respect to one of the other STAs 104, may be determined. In some embodiments, a direction of the detected movement with respect to the STA 102 may also be determined (e.g., if a user or other object is moving away or towards the STA 102. In these embodiments, STA 102 may be either an AP STA or non-AP STA, and the other STAs 104 may be either AP STAs or non-AP STAs. In some embodiments, the channel state may include a received signal strength or a received signal strength indicator (RSSI). In some embodiments, the channel state may include a frequency response (over time). In some embodiments, the channel state may comprise a channel state indicator (CSI).

In some embodiments, the proximity detection is performed when motion is detected in a majority (i.e., most) of the WLAN links. In some embodiments, proximity detection may be performed when motion is detected in at least a predetermined percentage of the WLAN links. In these embodiments, if motion is detected in at least some of the WLAN links, proximity detection is indicated.

In some embodiments, if motion is not detected in the majority of the WLAN links, the processing circuitry is configured to refrain from performing the proximity detection to indicate proximity.

Figure 2:
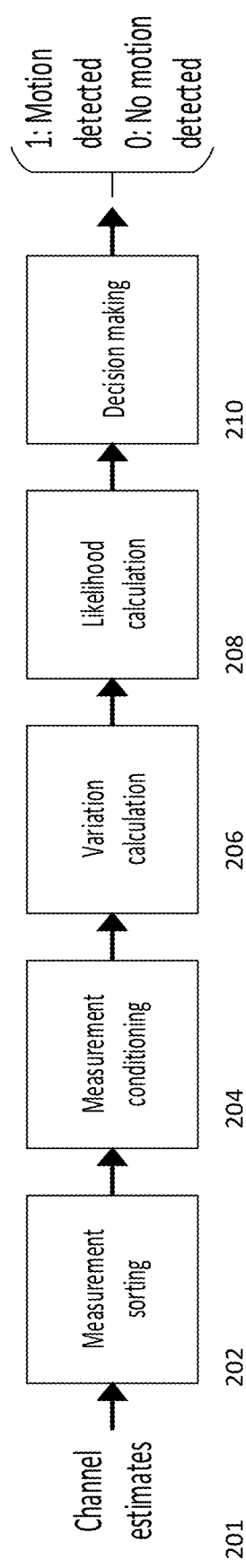
FIG. 2 is a block diagram illustrating signal processing operations for motion detection in accordance with some embodiments.

FIG. 2 is a block diagram illustrating signal processing operations for motion detection in accordance with some embodiments. In some embodiments, to detect motion for each of the tracked WLAN links, the processing circuitry is configured to receive channel estimates 201 for each of the WLAN links to track the channel state of the WLAN links that are being tracked. The channel estimates 201 for each link may be taken concurrently and with a predetermined periodicity (i.e., beacon frames can be used). In these embodiments, the processing circuitry may be configured to perform measurement sorting (in operation 202) to sort the channel estimates based at least on the SNR, perform measurement conditioning (in operation 204) on the sorted channel estimates to compensate the channel estimates for time and frequency offset, to interpolate for missing subcarriers, and to unwrap phase, to generate conditioned channel estimates. In these embodiments, the processing circuitry may be configured to perform a variation calculation (in operation 206) on the conditioned channel estimates to generate a time-dependent measure of channel variation. In these embodiments, the processing circuitry may be configured to perform a likelihood calculation (in operation 208) based on the time-dependent measure of channel variation to generate a likelihood value. In these embodiments, the processing circuitry may be configured to determine (in decision making operation 210) whether motion is detected in each of the tracked WLAN links based on application of a threshold to the likelihood value.

In some embodiments, the channel state of each WLAN may be based on channel estimates taken during a most recent time window (e.g., a few seconds). In some embodiments, the channel estimates may be based on beacon frames, although the scope of the embodiments is not limited in this respect.

In some embodiments, to measurement conditioning in operation 204, the channel may be estimated for any missing subcarriers using the channel estimate of adjacent subcarriers, including subcarrier zero (DC subcarrier). In these embodiments, the phase unwrapping may include reconstructing a physically continuous phase variation by adding or subtracting multiples of 2 pi to restore continuity of the phase map.

In some embodiments, to perform the measurement sorting in operation 202 to sort the channel estimates, the processing circuitry may be configured to select channel estimates having a greatest SNR, weight the channel estimates based on distance to a transmitting STA and whether link is a line-of site (LOS) link or a non-LOS link with a receiving STA. In some of these embodiments, low SNR channel estimates may be removed. In some embodiments, the channel state of each of the WLAN links is tracked based on channels estimates determined from a long-training field (LTF) of a PPDU (e.g., L-LTF or VHT-LTF). In some embodiments, the WLAN sensing may be performed using trigger-based PPDUs although the scope of the embodiments is not limited in this respect. An example of the use of trigger-based PPDUs for WLAN sensing is described in U.S. patent application Ser. No. 15/930,526 (filed May 13, 2020) (reference No. AC2245-US), which is incorporated herein by reference, and assigned to the same assignee as the present application. In some embodiments, the STA 102 is a non-AP STA, and at least one of the other STAs 104 is an AP STA.

In some embodiments, the measurement sorting operation 202 is responsible for selecting which of the channel estimates provided by the firmware are used by the motion detection mechanism. Since the firmware provides channel estimates obtained with PPDUs transmitted by various transmitters, a key operation performed by the measurement sorting operation 202 of a single-link motion detection mechanism is to select the WLAN link to be tracked, and use channel estimates obtained with PPDUs that have a given transmitter and/or receiver MAC address(es).

In some embodiments, the link to be tracked may be selected using a number of different criteria, including:
Estimated average SNR of the link. While a link with high SNR allows for a less noisy estimation of the channel, it may also indicate that the transmitter is very close to the device, would not be ideal for motion detection. Thus, the link selected should not only have a reasonable SNR but also allow for reasonable coverage of the target area.
Depending on the desired application, the fact that the link is line-of-sight (LoS) or non-line of-sight (NLoS) may have an impact and be used as one of the selection criteria for measurement sorting.

In order to help guarantee that measurements are taken with a given (relatively fixed) periodicity, the receiver may select to use beacon frames only (transmitted by a given AP). That is, the receiver may also consider the frame type when selecting the channel estimates to be used.

The output of the measurement sorting operation 202 may comprise channel estimates obtained with multiple (pre-selected) PPDUs over time.

For the measurement conditioning operation 204, the channel estimates provided by the WLAN chipset firmware are "raw" and should be compensated for time and frequency offset, for example. Phase unwrapping may also be performed at this stage. In addition, the measurement conditioning operation 204 may also responsible for handling standard-specific characteristics. For example, because signals are not transmitted at subcarrier 0—that is, the DC subcarrier—the measurement conditioning operation 204 may use channel estimates of adjacent subcarriers and interpolate for the missing one(s). The measurement conditioning operation 204 may also responsible for handling any other HW/firmware issues of the chipset. This may include estimation of other missing channel estimates.

Examples of the processing performed by the measurement conditioning operation 204 are shown in FIG. 3 (for the CFR amplitude) and FIG. 4 (for the CFR phase). In these examples, the measurement conditioning operation 204 performs time offset compensation, frequency offset compensation, interpolation for missing subcarriers, and phase unwrapping.

For the variance calculation operation 206, by taking as input conditioned channel estimates, a time-dependent measure of "channel variation" is calculated. In some embodiments, operation 206 may track the variance of changes in the phase of multiple channel estimates or changes in the eigenvalues of the covariance matrix of the channel estimates obtained with a given number of packets. In some embodiments, the operations illustrated in FIG. 5 may be used which include input selection, and eigenvalue characterization and selection described in more detail below.

Figure 5:
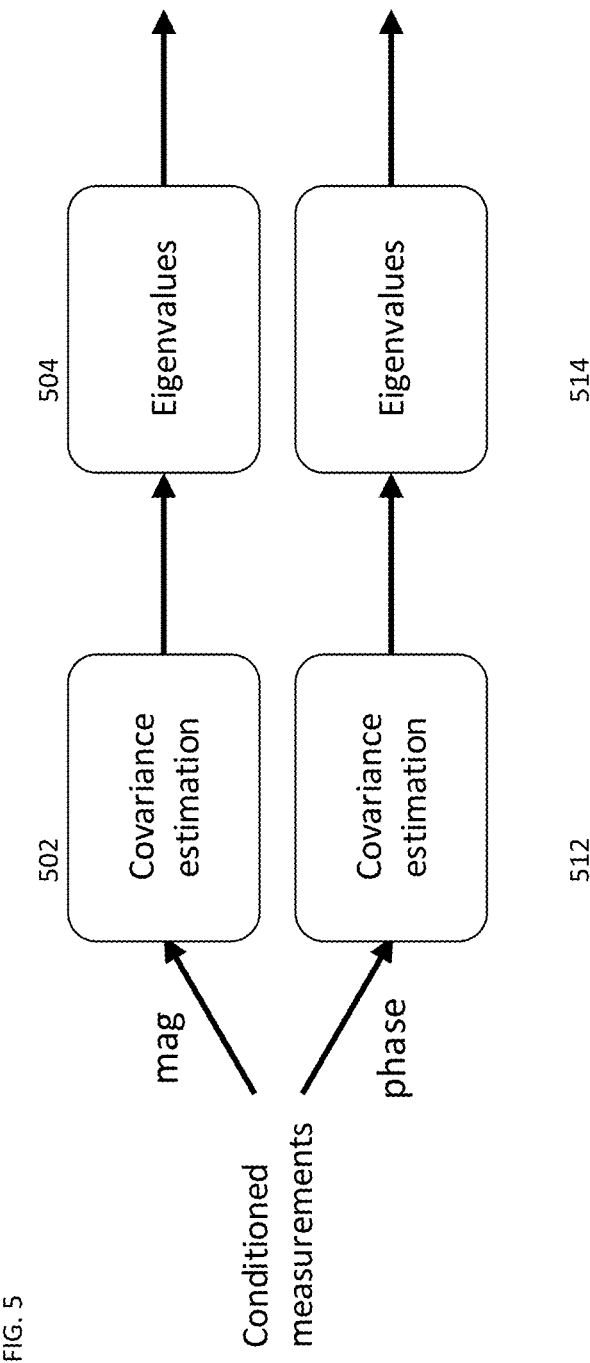
FIG. 5 is a block diagram illustrating signal processing operations for variance calculation in accordance with some embodiments.

FIG. 5 is a block diagram illustrating signal processing operations for variance calculation in accordance with some embodiments. The operations illustrated in FIG. 5 may be used to perform the variation calculation (in operation 206 (FIG. 2)) although the scope of the embodiments is not limited in this respect. In some embodiments, the processing circuitry of a STA may be configured to generate a covariance estimation (in operation 502) from the magnitude components and generate magnitude component eigenvalues (in operation 504) for the magnitude components based on the covariance estimation for the magnitude components. In these embodiments, each of the conditioned channel estimates comprises a magnitude component and a phase component. In these embodiments, the processing circuitry may also be configured to generate a covariance estimation (in operation 512) from the phase components, generate phase component eigenvalues (in operation 514) for the phase components based on the covariance estimation for the phase components, and select eigenvalues from the magnitude component eigenvalues and the phase component eigenvalues. The selected eigenvalues represent the time-dependent measure of channel variation. In these embodiments, consecutive eigenvalue sets may correspond to consecutive channel measurements.

In some embodiments, the likelihood value (e.g., generated in operation 208) for each selected eigenvalue may be calculated from a mean vector and a covariance matrix. In some embodiments, the eigenvalues may be selected from the magnitude component eigenvalues and the phase component eigenvalues based on their magnitude. In some embodiments, for selecting the eigenvalues, some of the phase component eigenvalues having the greatest magnitudes may be selected and some of the magnitude component eigenvalues having the greatest magnitudes are selected. In some other embodiments, three of the phase component eigenvalues having a greatest magnitude are selected and two of the magnitude component eigenvalues having second and third greatest magnitudes are selected (i.e., the magnitude component eigenvalue having the greatest magnitude is not necessarily used), although the scope of the embodiments is not limited in this respect.

As shown in FIG. 5, in variation calculation, the magnitude and phase of N conditioned measurements are separated, and an M×M covariance matrix is calculated for each of the two processes. Each of the two covariance matrices is independently processed to produce a column vector containing the eigenvalues of the matrix. For each eigenvalue set, the $E_{phase}$ (for the phase process) or $E_{magnitude}$ (for the magnitude process) largest eigenvalues are passed on to the following signal processing stage (likelihood calculation). Thus, for each N conditioned measurements input to variation calculation, $E_{phase}+E_{magnitude}$ eigenvalues are generated.

Figure 6:
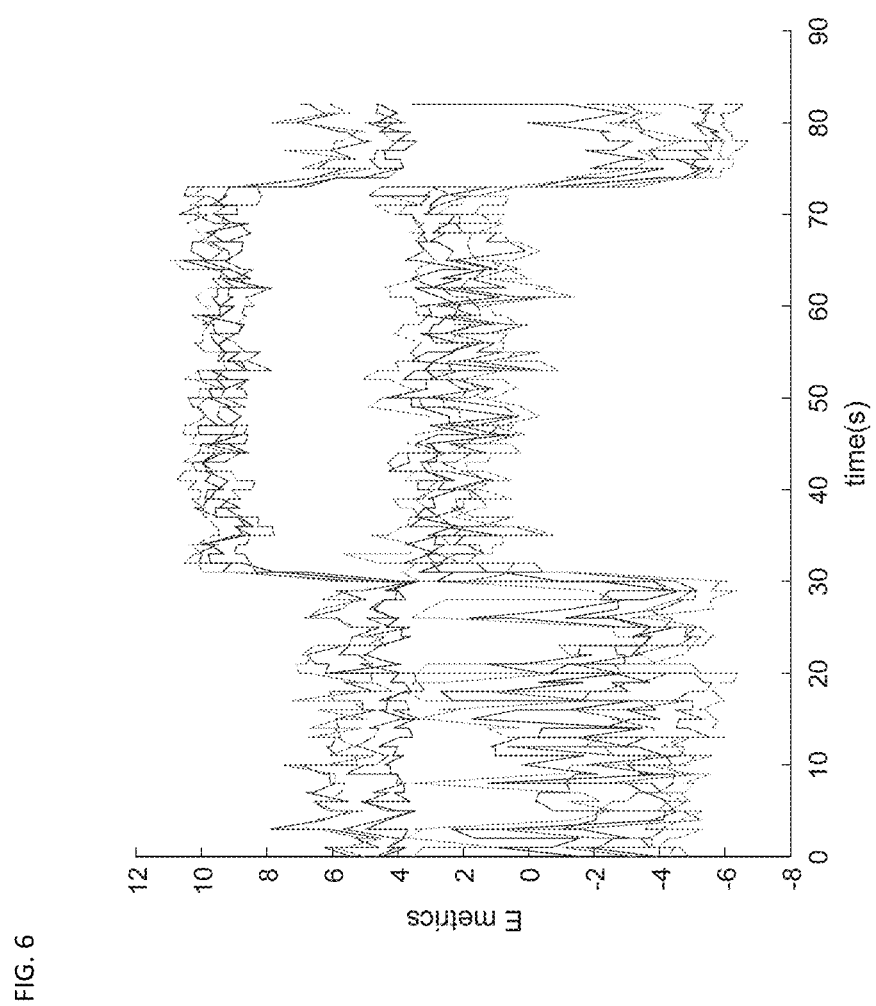
FIG. 6 illustrates an example output of the variance calculation operation in accordance with some embodiments.

To exemplify the output of the variation calculation operation 206, FIG. 6 shows an example obtained for a case when the environment first had no motion, followed by motion (person randomly walking in the room), and then no motion again. The figure shows a total of $E_{magnitude}=2$ and $E_{phase}=3$ values for two different links (RX antennas). In the example of FIG. 6, the output of the variation calculation stage is shown for a case when there was no motion in the environment for 30 s, then continuous motion for 40 s, and no motion for the remaining of the measurements (~12 s).

Some WLAN sensing application embodiments disclosed here may implement a time of detection requirement; for example, if motion starts in a given environment, the motion detection mechanism must flag it within 500 ms. Since the variation calculation stage is the one that introduces the largest latency to the mechanism (since it must accumulate N conditioned measurements), the application requirement has an impact on the variance calculation operation 206. Thus, in practical applications, the variance calculation operation 206 may have to output a new set of values every $T_{req}$ seconds and, unfortunately, the time in which new channel estimates are received is random (PPDUs are dropped, for example). In these embodiments, the following approach may be used: Every $T_{req}$ seconds, the variance calculation operation 206 outputs a new set of eigenvalues. To calculate the eigenvalues, N measurements may be used. Thus, every time new eigenvalue sets are calculated (every $T_{req}$ seconds), the last N measurements are provided by the measurement conditioning operation 204. If less than N measurements have been output since the last calculation, some of the values that were used in the previous eigenvalue calculation may be reused. This means that some measurements would impact consecutive eigenvalue sets. If exactly N measurements were output since the last calculation, the two consecutive eigenvalues sets would be based on different measurements. If more than N measurements were output since the last calculation, some measurements would not be used. In this case, like the one before, two consecutive eigenvalue sets would be based on different measurements.

In some alternate embodiments, a new eigenvalue set may be generated once $N_{new}$ measurements are provided by the previous operation, where $N_{new}$ could be equal to N (disjoint sets) or less than N (some measurements are re-used). In this case, the system would not be able to guarantee that a new set of eigenvalues are produced every $T_{req}$ seconds.

Regarding eigenvalue selection, a number of issues impact the number, as well as which, eigenvalues should be selected and passed to the likelihood calculation operation 208. In some embodiments, the eigenvalues calculated for a given input are correlated. Therefore, using all eigenvalues do not necessarily improve the overall performance of the mechanism (law of diminishing returns). Also, the complexity of likelihood calculation increases with the number of eigenvalues. Thus, it is reasonable to limit the number of eigenvalues that are passed on to the likelihood calculation operation 208. In some example embodiments, the first three largest eigenvalues of the phase, and the second and third largest eigenvalue of the magnitude maybe used although the scope of the embodiments is not limited in this respect.

In the likelihood calculation operation 208, the likelihood that the new set of eigenvalues provided by the prior stage "belongs" to the case (hypothesis) when there is no movement in the room is calculated. In some embodiments, it is reasonable to assume that the mechanism will have a chance to train and learn the statistics that correspond to the case when there is no motion. In some embodiments, the set of eigenvalues may be appropriately modeled by a multi-dimensional Gaussian distribution; thus, during the training period, the mean vector and covariance matrix of the eigenvalue set may be estimated. In these embodiments, for each new eigenvalue set E, the following may be calculated:

$$l(E)=(E-m)^T C^{-1}(E-m)$$

where m and C are, respectively, the mean vector and covariance matrix of E for the no motion case/hypothesis. The value l(E) is passed to the decision making operation 210.

In these embodiments, the likelihood of E belonging to the no movement hypothesis may be calculated and that, different from conventional statistical tests used in communications, the likelihood of E belonging to the motion hypothesis does not necessarily need to be calculated. This is because it is not possible to statistically characterize the many different ways that a person or object could move and interact with the environment. Some embodiments may not have the benefit of training the mechanism for a particular set of motion. Such an approach is common to anomaly detection problems which consist in " . . . the identification of rare items, events or observations which raise suspicions by differing significantly from the majority of the data."

In some embodiments, the decision-making operation 210 takes the value l(E) and makes a binary decision: 1: Motion detected or 0: No motion detected. In these embodiments, the decision is made based on a threshold-based approach:

l(E)≥T→Motion detected l(E)<T→No motion detected

One key element of this stage is how to set the threshold T. In some embodiments that have the benefit of training the system for the no motion case, during a training interval, it may be possible to calculate l(E) for a number of E values. With such l(E) values. their mean and variance may then be characterized. In these embodiments, with their values, the threshold may be set to be equal to either the mean value plus a selected number of standard deviations, or the mean value multiplied by a constant. In some embodiments, the threshold used by the decision-making operation 210 may ultimately determines the probabilities of detection and false alarm of the complete system. Through reasonable experimentation and testing, the threshold may be changed to satisfy system requirements.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE draft specification IEEE P802.11ax/D4.0, February 2019 is incorporated herein by reference in its entirety. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

Figure 7:
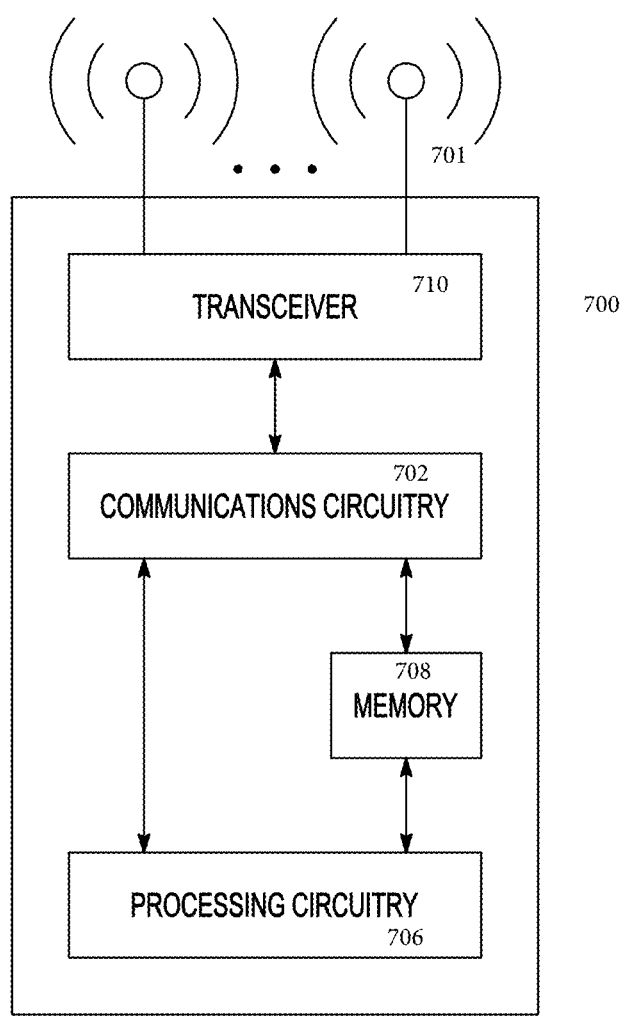
FIG. 7 illustrates a functional diagram of an exemplary communication station, in accordance with one or more example embodiments of the present disclosure.

FIG. 7 illustrates a functional diagram of an exemplary communication station, in accordance with one or more example embodiments of the present disclosure. In some embodiments, FIG. 7 illustrates a functional block diagram of a communication station that may be suitable for use as a client/user device or non-AP STA, such as non-AP STA 102 or an AP STA (e.g., AP STA 104 or 106) (See FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations described herein.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the apparatus comprising:
 processing circuitry; and
 memory, wherein when the STA is configured by the processing circuitry for proximity detection by multiple WLAN link tracking, the processing circuitry is configured to:
 perform WLAN sensing using two or more WLAN links with one or more other STAs to track a channel state of each link, the channel state to include at least a signal-to-noise ratio (SNR);
 perform motion detection based on the tracked channel state of each WLAN link to detect motion in any of the two or more WLAN links;
 if motion is detected in at least some of the two or more WLAN links, perform proximity detection to indicate proximity by combining results of the WLAN sensing for each link to determine whether the motion is proximate to the STA or proximate to one of the one or more other STAs,
 wherein the memory is configured to store the tracked channel state of each WLAN link.

2. The apparatus of claim 1 wherein proximity detection is performed when motion is detected in a majority of the two or more WLAN links.

3. The apparatus of claim 2, wherein if motion is not detected in the majority of the two or more WLAN links, the processing circuitry is configured to refrain from performing the proximity detection to indicate proximity.

4. The apparatus of claim 1, wherein to detect motion for each of the tracked WLAN links, the processing circuitry is configured to:
 receive channel estimates for each of the two or more WLAN links to track the channel state of the two or more WLAN links that are being tracked, the channel estimates for each link taken concurrently and with a predetermined periodicity;
 perform measurement sorting to sort the channel estimates based at least on the SNR;
 perform measurement conditioning on the sorted channel estimates to compensate the channel estimates for time and frequency offset, to interpolate for missing subcarriers, and to unwrap phase, to generate conditioned channel estimates;
 perform a variation calculation on the conditioned channel estimates to generate a time-dependent measure of channel variation; and
 perform a likelihood calculation based on the time-dependent measure of channel variation to generate a likelihood value;
 determine whether motion is detected in each of the tracked WLAN links based on application of a threshold to the likelihood value.

5. The apparatus of claim 4, wherein each of the conditioned channel estimates comprises a magnitude component and a phase component, and
 wherein to perform the variation calculation, the processing circuitry is configured to:
 generate a covariance estimation from the magnitude components;
 generate magnitude component eigenvalues for the magnitude components based on the covariance estimation for the magnitude components;
 generate a covariance estimation from the phase components;
 generate phase component eigenvalues for the phase components based on the covariance estimation for the phase components; and
 select eigenvalues from the magnitude component eigenvalues and the phase component eigenvalues, the selected eigenvalues representing the time-dependent measure of channel variation,
 wherein consecutive eigenvalue sets correspond to consecutive channel measurements.

6. The apparatus of claim 5, wherein the likelihood value for each selected eigenvalue is calculated from a mean vector and a covariance matrix.

7. The apparatus of claim 5, wherein the eigenvalues are selected from the magnitude component eigenvalues and the phase component eigenvalues based on magnitude.

8. The apparatus of claim 4, wherein to perform the measurement sorting to sort the channel estimates, the processing circuitry is configured to select channel estimates having a greatest SNR, weight the channel estimates based on distance to a transmitting STA and whether link is a line-of site (LOS) link or a non-LOS link with a receiving STA.

9. The apparatus of claim 5 wherein the channel state of each of the two or more WLAN links is tracked based on channels estimates determined from a long-training field (LTF) of a PPDU.

10. The apparatus of claim 5, wherein the STA is a non-AP STA, and at least one of the other STAs is an AP STA.

11. A non-transitory computer-readable storage medium that stores instructions for execution by processing circuitry of a station (STA) to configure the processing circuitry for proximity detection by multiple WLAN link tracking, wherein the processing circuitry is configured to:
perform WLAN sensing using two or more WLAN links with one or more other STAs to track a channel state of each link, the channel state to include at least a signal-to-noise ratio (SNR);
perform motion detection based on the tracked channel state of each WLAN link to detect motion in any of the two or more WLAN links;
if motion is detected in at least some of the two or more WLAN links, perform proximity detection to indicate proximity by combining results of the WLAN sensing for each link to determine whether the motion is proximate to the STA or proximate to one of the one or more other STAs.

12. The non-transitory computer-readable storage medium of claim 11 wherein proximity detection is performed when motion is detected in a majority of the two or more WLAN links.

13. The non-transitory computer-readable storage medium of claim 12, wherein if motion is not detected in the majority of the two or more WLAN links, the processing circuitry is configured to refrain from performing the proximity detection to indicate proximity.

14. The non-transitory computer-readable storage medium of claim 11, wherein to detect motion for each of the tracked WLAN links, the processing circuitry is configured to:
receive channel estimates for each of the two or more WLAN links to track the channel state of the two or more WLAN links that are being tracked, the channel estimates for each link taken concurrently and with a predetermined periodicity;
perform measurement sorting to sort the channel estimates based at least on the SNR;
perform measurement conditioning on the sorted channel estimates to compensate the channel estimates for time and frequency offset, to interpolate for missing subcarriers, and to unwrap phase, to generate conditioned channel estimates;
perform a variation calculation on the conditioned channel estimates to generate a time-dependent measure of channel variation; and
perform a likelihood calculation based on the time-dependent measure of channel variation to generate a likelihood value;
determine whether motion is detected in each of the tracked WLAN links based on application of a threshold to the likelihood value.

15. The non-transitory computer-readable storage medium of claim 14, wherein each of the conditioned channel estimates comprises a magnitude component and a phase component, and
wherein to perform the variation calculation, the processing circuitry is configured to:
generate a covariance estimation from the magnitude components;
generate magnitude component eigenvalues for the magnitude components based on the covariance estimation for the magnitude components;
generate a covariance estimation from the phase components;
generate phase component eigenvalues for the phase components based on the covariance estimation for the phase components; and
select eigenvalues from the magnitude component eigenvalues and the phase component eigenvalues, the selected eigenvalues representing the time-dependent measure of channel variation,
wherein consecutive eigenvalue sets correspond to consecutive channel measurements.

16. The non-transitory computer-readable storage medium of claim 15, wherein the likelihood value for each selected eigenvalue is calculated from a mean vector and a covariance matrix.

17. The non-transitory computer-readable storage medium of claim 15, wherein the eigenvalues are selected from the magnitude component eigenvalues and the phase component eigenvalues based on magnitude.

18. The non-transitory computer-readable storage medium of claim 14, wherein to perform the measurement sorting to sort the channel estimates, the processing circuitry is configured to select channel estimates having a greatest SNR, weight the channel estimates based on distance to a transmitting STA and whether link is a line-of site (LOS) link or a non-LOS link with a receiving STA.

19. An apparatus of a station (STA), the apparatus comprising: processing circuitry; and memory, wherein when the STA is configured by the processing circuitry to detect motion for each of a plurality of tracked WLAN links, the processing circuitry is configured to:
receive channel estimates for each of the WLAN links to track a channel state of the WLAN links that are being tracked, the channel estimates for each link taken concurrently and with a predetermined periodicity;
perform measurement sorting to sort the channel estimates based at least on a signal-to-noise ratio (SNR);
perform measurement conditioning on the sorted channel estimates to compensate the channel estimates for time and frequency offset, to interpolate for missing subcarriers, and to unwrap phase, to generate conditioned channel estimates;
perform a variation calculation on the conditioned channel estimates to generate a time-dependent measure of channel variation; and
perform a likelihood calculation based on the time-dependent measure of channel variation to generate a likelihood value; and determine whether motion is detected in each of the tracked WLAN links based on application of a threshold to the likelihood value.

20. The apparatus of claim 19, wherein each of the conditioned channel estimates comprises a magnitude component and a phase component, and wherein to perform the variation calculation, the processing circuitry is configured to:

generate a covariance estimation from the magnitude components;

generate magnitude component eigenvalues for the magnitude components based on the covariance estimation for the magnitude components;

generate a covariance estimation from the phase components;

generate phase component eigenvalues for the phase components based on the covariance estimation for the phase components; and select eigenvalues from the magnitude component eigenvalues and the phase component eigenvalues, the selected eigenvalues representing the time-dependent measure of channel variation, wherein consecutive eigenvalue sets correspond to consecutive channel measurements.

* * * * *